United States Patent [19]
Phillips

[11] Patent Number: 5,833,074
[45] Date of Patent: Nov. 10, 1998

[54] FAST-LOADING, PROTECTIVE BICYCLE RACK

[76] Inventor: Cal M. Phillips, 4435 Jewell La., Platteville, Wis. 53818

[21] Appl. No.: 418,586

[22] Filed: Apr. 6, 1995

[51] Int. Cl.[6] .................................................. A47F 7/00
[52] U.S. Cl. .............................. 211/21; 211/17; 224/309; 224/924
[58] Field of Search .................................. 211/21, 20, 17, 211/22; 224/309, 924

[56] References Cited

U.S. PATENT DOCUMENTS

| | | | |
|---|---|---|---|
| 703,280 | 6/1902 | Knoche | 211/20 |
| 3,116,836 | 1/1964 | McCauley | 211/21 |
| 3,355,028 | 11/1967 | Mork | 211/21 |
| 3,529,737 | 9/1970 | Daugherty | 224/924 X |
| 3,843,001 | 10/1974 | Willis | 224/924 X |
| 3,861,533 | 1/1975 | Radek | 211/20 |
| 4,852,779 | 8/1989 | Berg | 224/924 X |

FOREIGN PATENT DOCUMENTS

104714  6/1942  Sweden ............................... 224/924

*Primary Examiner*—Robert W. Gibson, Jr.
*Attorney, Agent, or Firm*—John V. Stewart

[57] ABSTRACT

A rack for holding bicycles and other velocipeds by their tires only. For use as a carrier on motor vehicles, or for display racks and the like. Comprises an elongated U-channel track into which are set the bicycle wheels. An inverted U-shaped arm at each end of the track contacts the nearest tire of the bicycle above its axle level. At least one of the arms pivots, to clamp the tires between the two arms and between the arms and the track, restraining the bicycle in all directions by its tires, and to quickly release the bicycle with only one operation.

7 Claims, 7 Drawing Sheets

FAST-LOADING, PROTECTIVE BICYCLE RACK

BACKGROUND

1. Field

This invention relates to racks for holding bicycles, including display, storage, or parking racks, and especially bicycle carriers on motor vehicles.

2. Prior art

Existing racks for carrying bicycles on motor vehicles use hangers, clamps, elastic straps, or quick-release cams to hold the bicycle in the rack. These devices require multiple operations to secure or release the bicycle. Hangers and clamps can mar the finish of a bicycle frame due to the jolting and vibration of a traveling vehicle. Straps are subject to loosening, tearing, and deterioration.

Bicycle wheels should not be free to spin in the slipstream of a motor vehicle, and the steering wheel of the bicycle should not be free to turn. Otherwise, damage to the bicycle and/or the motor vehicle can result. Many racks do not inherently secure the wheels, relying on the competence and discretion of the user to do so with straps.

U.S. Pat. No. 4,875,608 (Graber) is an example of the prior art. It shows a folding bicycle carrier mounted on the rear of a vehicle. Each wheel is strapped to a track, and the bicycle frame is clamped to the carrier. This design inherently secures the wheels, but the straps and clamps have the disadvantages described above.

U.S. Pat. No. 3,659,762 (Kravitz) shows a bicycle carrier with deep wells for holding a bicycle by its wheels. The bicycle must be strapped to the wells, since it is not clamped by them. Otherwise, it could fly upward in the event of a bump in the road. There is no adjustment for different sized bicycles, so the wells are a loose fit, requiring straps to eliminate play of the bicycle within the wells.

Some bicycle carriers require removal of the front wheel, and bolting or clamping of the front drop-outs to the carrier. This is inconvenient, even with a quick-release hub on the bicycle and/or a quick-release drop-out clamp on the carrier. The front wheel must be strapped individually to the carrier or stowed elsewhere, possibly bending the rim or spokes, or scratching the carrier or vehicle.

OBJECTIVES and SUMMARY

Objects

The objects of this invention are to provide a rack that:

(a) holds bicycles securely for use as an external carrier on motor vehicles;
(b) does not scratch the bicycle frame;
(c) can be loaded and unloaded quickly using only one operation;
(d) locks the steering wheel of the bicycle to prevent damage;
(e) prevents the wheels from spinning in the vehicle slipstream;
(f) does not hold a wheel in front of the vehicle exhaust.

Summary

This bicycle rack achieves these objectives. It holds bicycles by their tires only, protects the bicycle frame from scratches, and prevents the wheels from spinning or turning. A bicycle is placed with its wheels in a U-channel track. A pivoting, inverted U-shaped arm attached to each end of the track pivots inward, against and around each tire, bracketing the bicycle in all directions. After an initial adjustment of one of the arms, a bicycle can be loaded into the rack using only one operation. Unloading requires only one operation.

REFERENCE NUMERALS

1. Track
2. Arm
3. Pivot axis of arm
4. Pivot journal of arm
5. Threaded-rod brace for pivoting arm
6. Knob
7. Pivoting bracket
8. C-journal
9. Pivoting bolt
10. Support beam
11. Stem of knob
12. Transverse bar
13. Contact point of arm and tire
14. Angle from distal point of tire to contact point of arm on tire
16. Wheel
17. Tire
18. Wheel axle
21. Guide for sliding handle
22. Sliding handle
23. Catch
24. Plain brace for pivoting arm

TERMINOLOGY

U-shaped
  Also includes V-shaped, and approximations and extensions of these shapes. For the arms (2), an extension of "U-shaped" includes closing the "U" to form an "O".

Outer, Distal
  Farthest from the center of the assembly under consideration. The distal point of a bicycle tire should be considered relative to the bicycle, and is the point farthest from the center of the bicycle. This is the front-most point of the front tire and the rear-most point of the rear tire.

Outwardly
  In a direction away from the center of the assembly under consideration. The assembly is the rack unless otherwise stated.

Major radius or diameter
 Refers to the generally toric shape of a tire.
Parallel
 Also includes co-linear.
Velociped
 A wheeled vehicle motivated by human power, such as a bicycle, tricycle, or quadricycle.

DESCRIPTION

This bicycle rack is designed for mounting on motor vehicles as a carrier, or for use as a secure bicycle stand. It holds a bicycle by its tires, avoiding scratches on the frame. It is faster and easier to load and unload than existing bike carriers.

Figure 1:
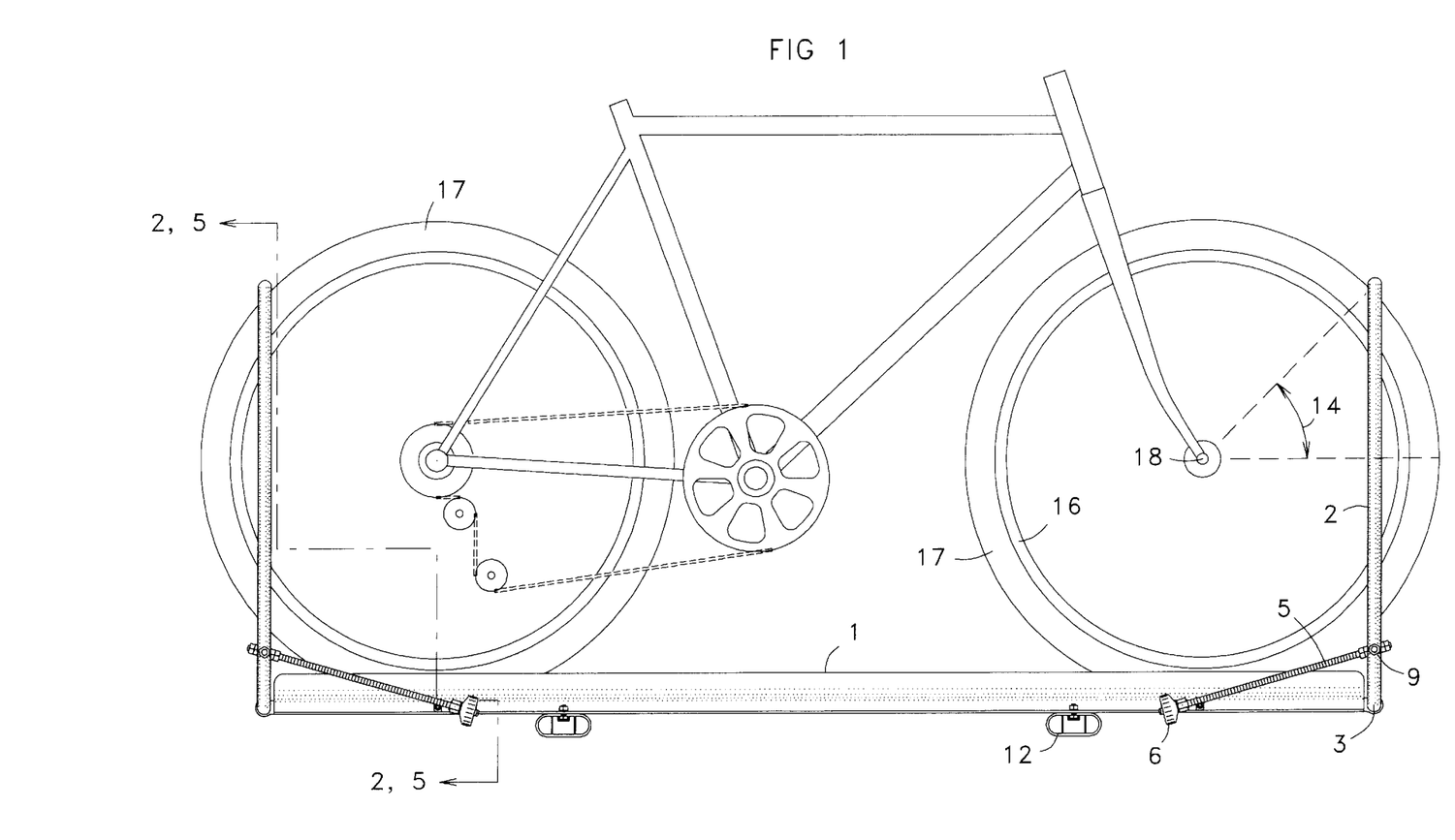
FIG. 1 Side view of the rack holding a bicycle.
Figure 2:
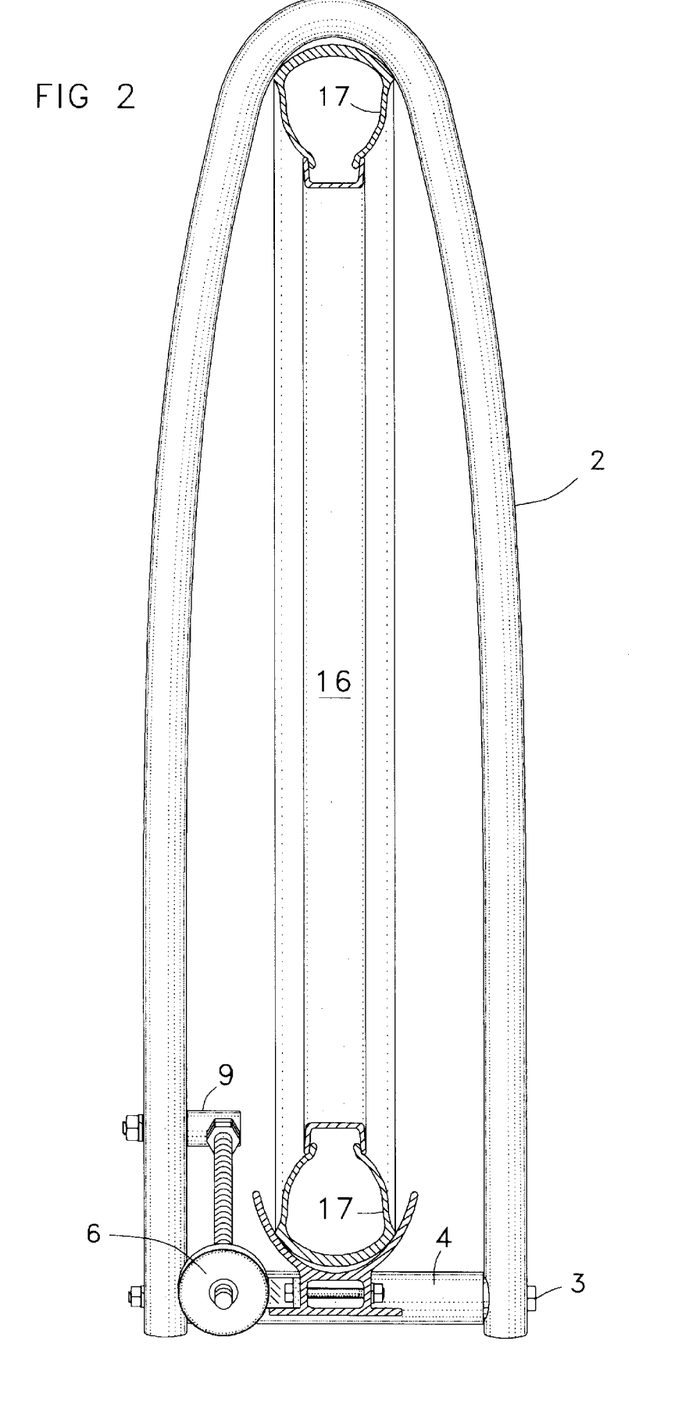
FIG. 2 Partial sectional view per the section line in FIG. 1.
Figure 3:
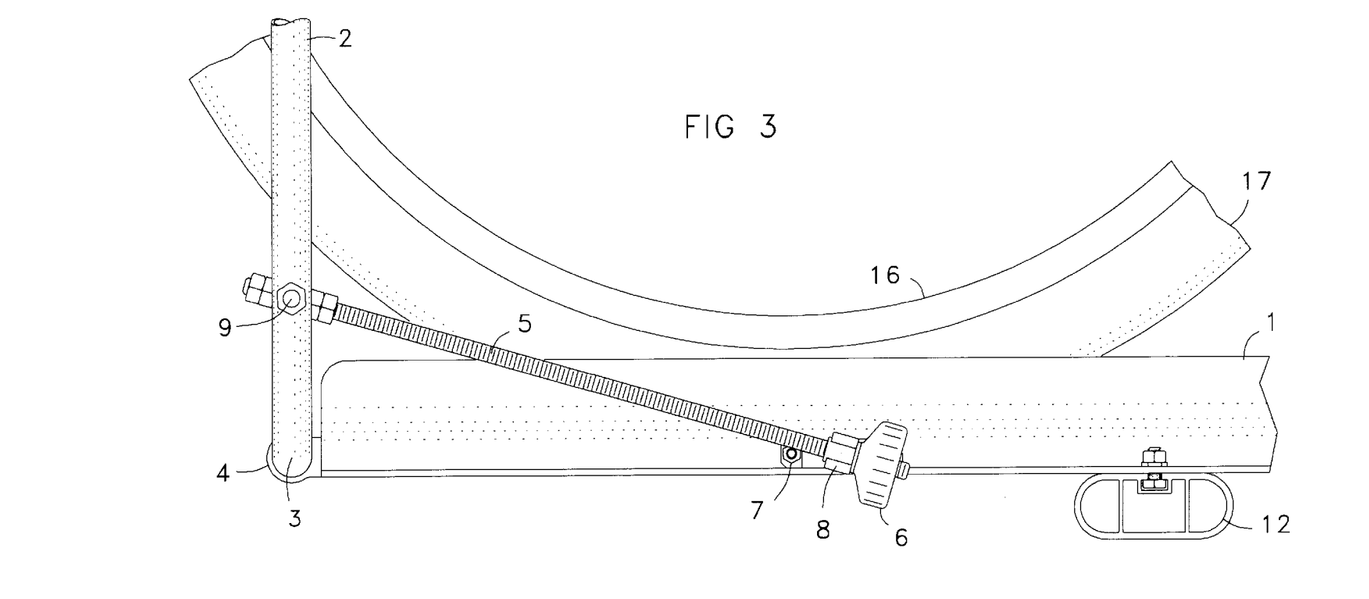
FIG. 3 Enlarged view of an end of the rack of FIG. 1.
Figure 4:
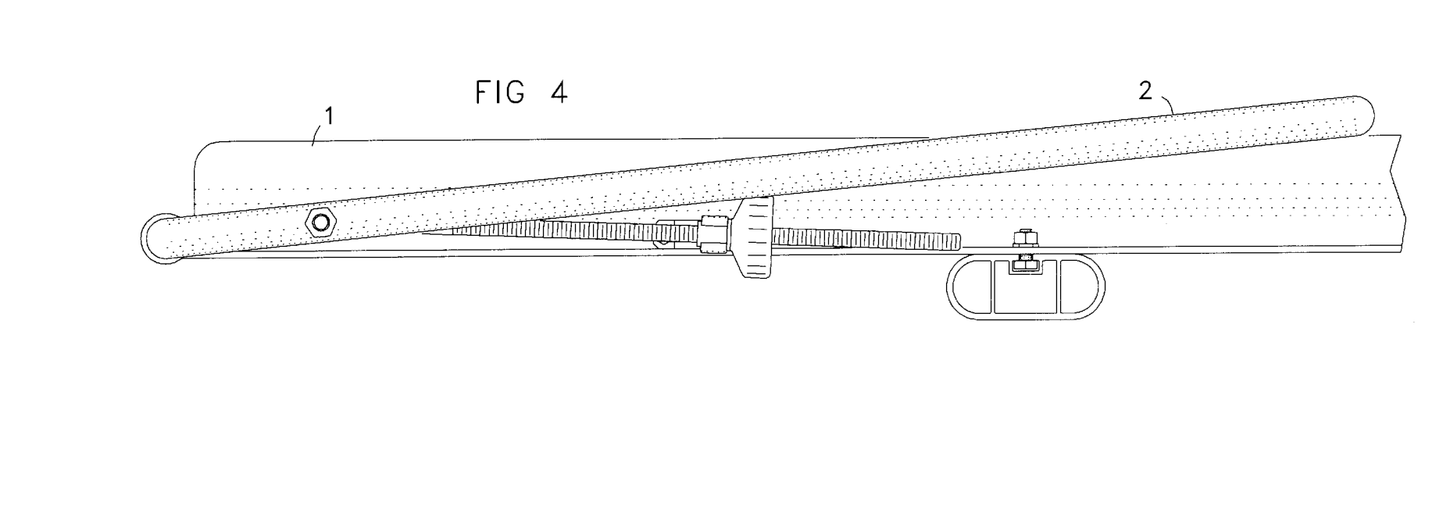
FIG. 4 A view as in FIG. 3, with the arm folded.
Figure 5:
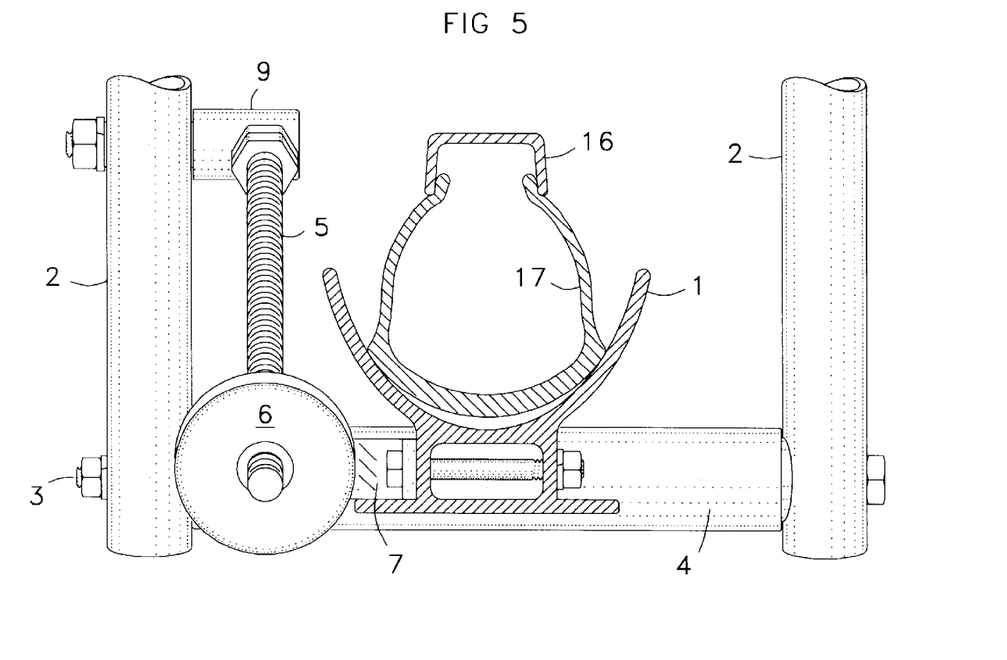
FIG. 5 Enlarged view of the lower part of FIG. 2.
Figure 6:
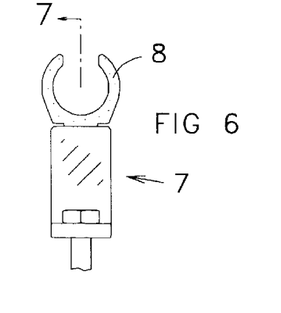
FIG. 6 Side view of swivel bracket 7 for knob 6.
Figure 7:
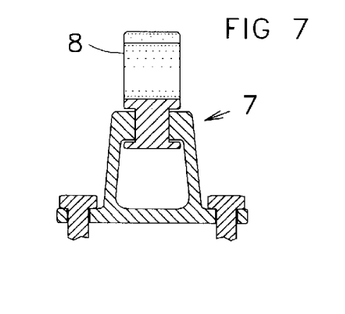
FIG. 7 Sectional front view of FIG. 6.
Figure 8:
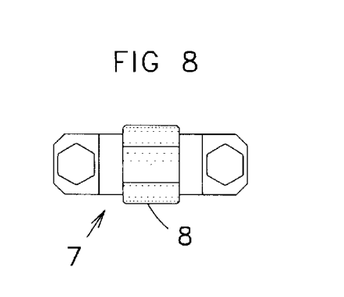
FIG. 8 Top view of FIG. 6.
Figure 9:
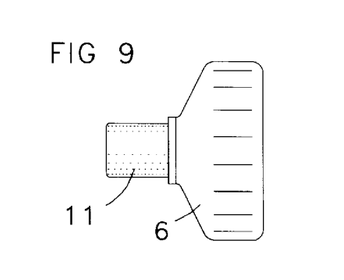
FIG. 9 Side view of a knob 6 for the arm adjuster.
Figure 10:
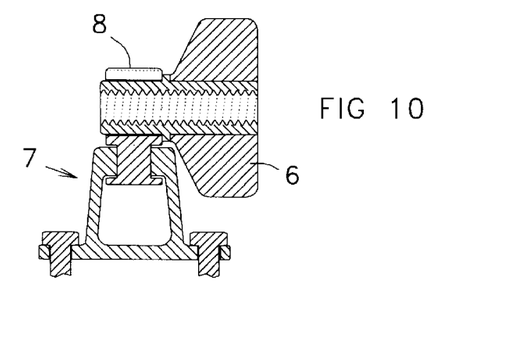
FIG. 10 Sectional front view of knob 6 in bracket 7.

In the embodiment of FIGS. 1–11, conventional roof luggage bars 12 are mounted laterally across the roof of a vehicle. A track 1 is mounted across at least two them, oriented longitudinally with respect to the vehicle. An arm 2 in the shape of an inverted "U" is mounted vertically at each end of the track. Each bike tire is held by one of the arms as shown in FIGS. 1 and 2. At least one of the two arms pivots at its base to allow insertion and removal of the bike. The pivoting arm is controlled by a tightening mechanism which pulls the arm inward against the tire. Preferably, both arms pivot fully inward to lie against the track when the rack is not in use.

Each arm contacts the tire above its mid-point, preferably about 45 degrees upward from hub level. This brackets and blocks the bike from moving both longitudinally and vertically. Thus, the bike is held firmly in place and can neither bounce upward nor roll off the track. The arms contact only the tires.

In FIGS. 1–11, the arm control mechanism comprises a threaded rod 5 that is connected diagonally between the arm and track. The connection at each end of the rod pivots to accommodate the varying angle of the rod with respect to the arm and track. The rod is connected to the track by a bracket 7 that has a swiveling C-shaped journal 8. This journal holds the stem 11 of the knob. The knob is threaded onto the rod and the knob stem is set into the C-journal to pull the arm inward against the tire. The knob can be unscrewed on the rod until its stem clears the C-journal. Then the rod can be slipped out of the C-journal, releasing the arm to swing away from the bike tire.

Other mechanisms can be used to control the pivoting arms. For example, FIGS. 12–15 show an arm brace 24 pivotally attached at one end to the arm 2, and at the other end to a handle 22 that slides along a linear guide 21 on the track 1. A spring-loaded releasable catch 23 on the handle engages the guide or track to fix the handle relative to the guide. It preferably allows sliding of the handle in only one direction without release of the catch, as shown by arrows in FIG. 15. This handle provides rapid operation of the arms. For car-top racks the front arm can be limited in its outward rotation to the vertical position by a stop in the guide. This avoids excess stress on the catch in the event of an emergency stop of the vehicle. One embodiment of the catch mechanism uses a linear gear rack along the guide. A spring-loaded releasable toothed catch on the handle engages the teeth of the gear rack. Another embodiment uses a cam lever, arranged so that friction of the guide or track against the cam lobe tightens the cam engagement when the handle is pulled toward the outside of the track.

In another arm-control embodiment, a strap or line is tied, hooked, clamped, or buckled diagonally from an arm to the track.

Figure 11:
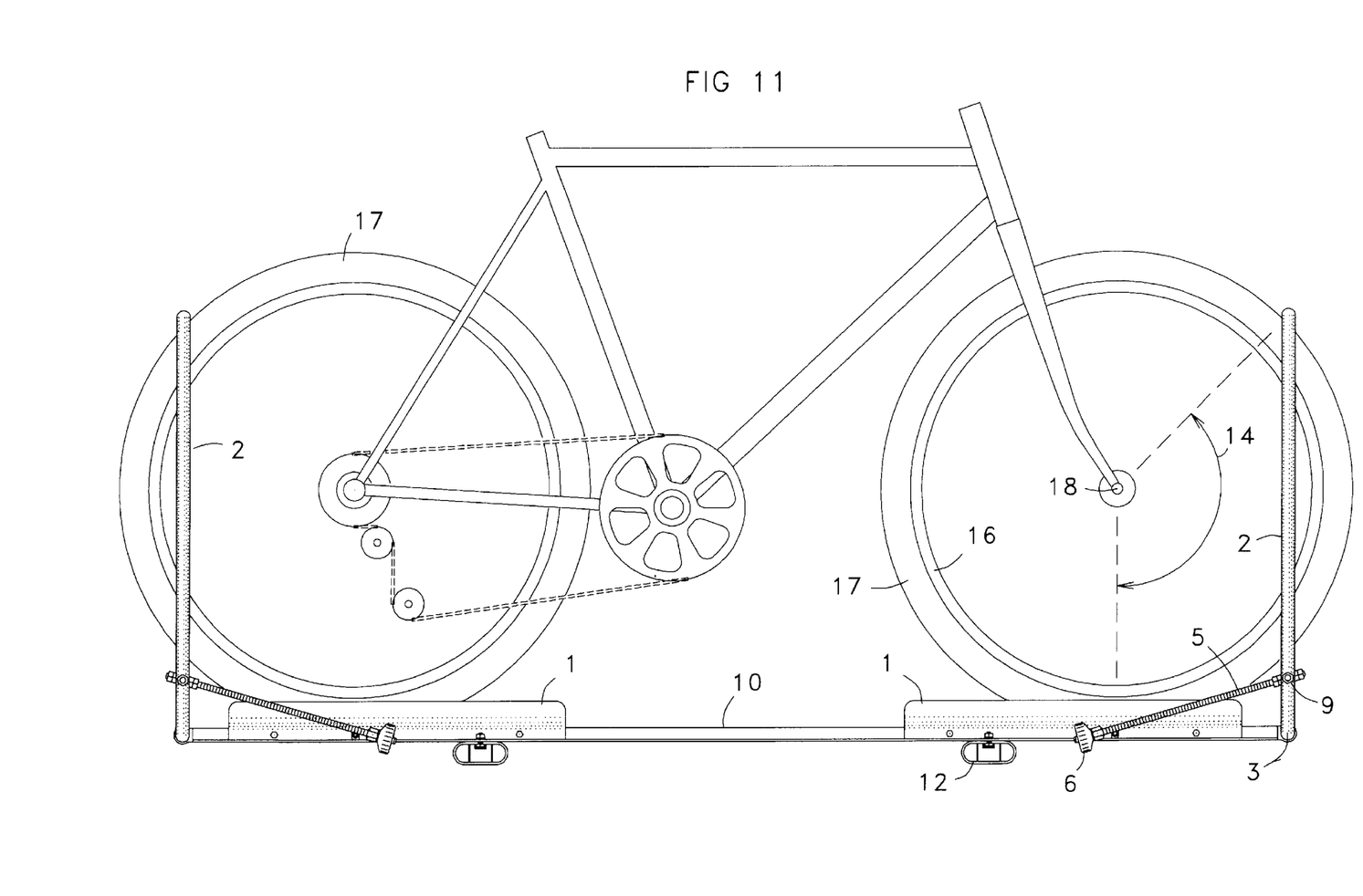
FIG. 11 Side view of the rack with separate track sections for each tire.
Figure 12:
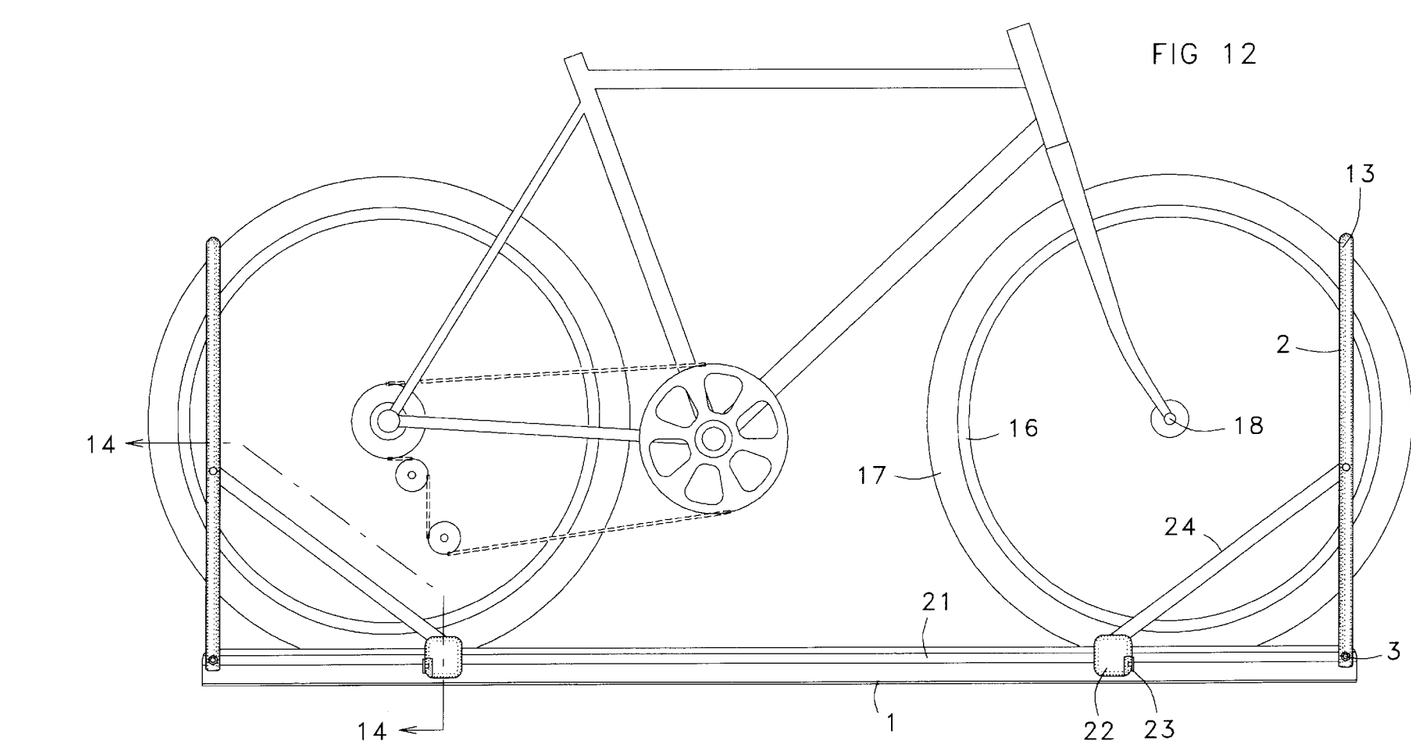
FIG. 12 Side view of another embodiment of the rack, with sliding handles for quick arm angle control.
Figure 13:
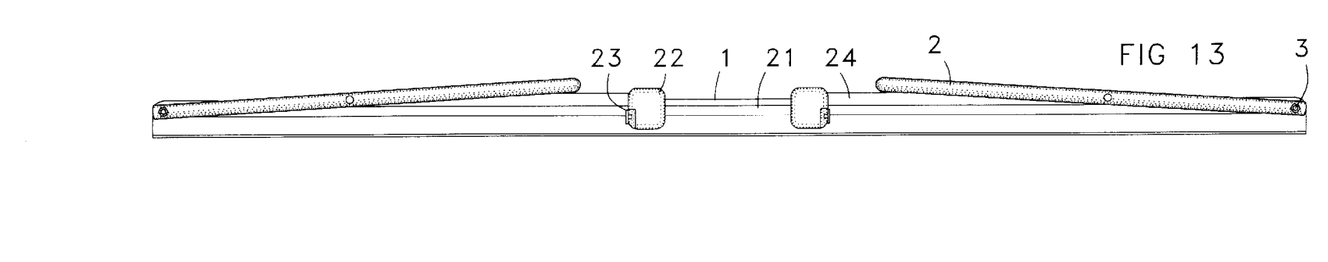
FIG. 13 View as in FIG. 12, with the arms folded.
Figure 14:
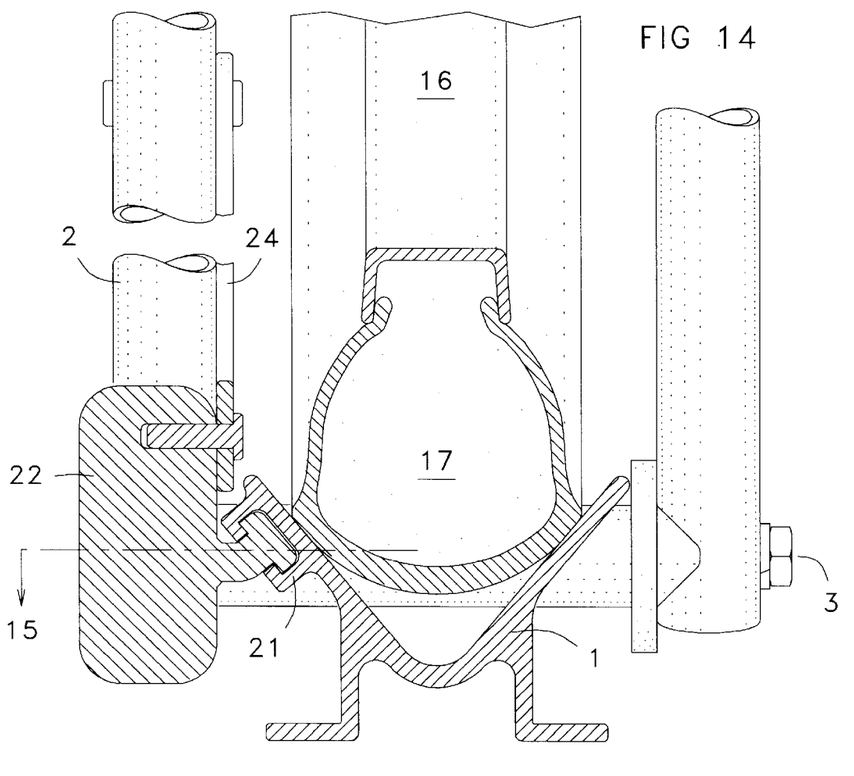
FIG. 14 Partial sectional view per the section line in FIG. 12.
Figure 15:
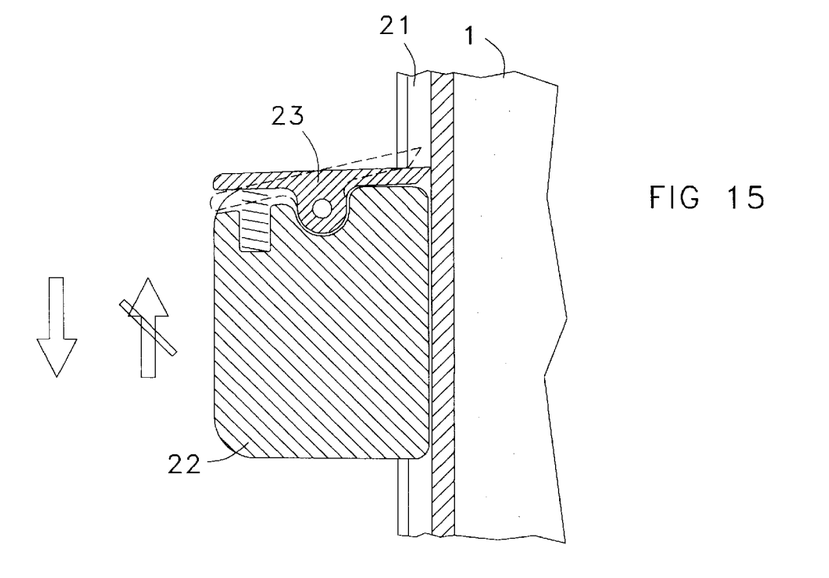
FIG. 15 Partial sectional view per the section line in FIG. 13.

Any rigid structural material may be used for the track, preferably extruded aluminum. To save material, a short track for each tire may be mounted near each end of a support beam as shown in FIG. 11, the support beam having a smaller cross-section area than the tracks.

In addition to a bike carrier for motor vehicles, the rack can be used as a secure bike stand for parking, sales display, and the like. For sales display, the angle of one arm is set by an adjustment mechanism as shown and described, to accommodate different sized bikes. The other arm is urged inward by a spring, allowing a bike to be rolled off the track against the spring-loaded arm, which then stays open until a catch is released. Means can be provided for locking the pivoting arm in the installed position for security when the store is closed or sales personnel are unavailable.

Simpler connection hardware may be used where quick loading is not needed, such as for a sales display where customer removal of the bike is not desired. In this case, the diagonal brace can be simply bolted between the arm and track. The track can have multiple bolt holes to accommodate different sized bicycles.

For tricycles, 3 short tracks can be attached to a frame in positions corresponding to each wheel, with an arm for each track. The arms for at least one end of the tricycle must pivot—for example, the arm for the front wheel. Alternately, 3 bicycle racks may be fixed close together in parallel, using one end of each track for a wheel of the tricycle. Likewise, a quadricycle may use two bicycle racks.

For bicycle carriers on the rear of motor vehicles, the transverse bars 12 extend longitudinally back from the rear of the vehicle by incorporating them into a conventional type of bicycle carrier framework. One or more tracks is mounted horizontally across the bars, at or above bumper level.

PREFERRED EMBODIMENT

The preferred embodiment is shown in FIGS. 1–10.

OPERATION

ADJUSTMENT

One of the U-arms is positioned via the pivot adjustment mechanism to hold the desired angle for bracketing a tire. The best angle for each tire size can be labeled on a protractor attached to the track, or the bicycle can be centered in the track and both arms pivoted inward, this constituting the first loading of the bicycle on the rack. One arm can then remain stationary through subsequent unloadings and loadings until the rack is folded or the bicycle size is changed.

FOLDING

Both arms are folded inward against the track, and held in position with the pivot adjustment mechanism or an auxiliary clip, pin, or the like.

LOADING

A bicycle is placed with its wheels in the track and pushed against the stationary arm which has been adjusted as above. The other arm is pivoted against the nearest tire with the pivot adjustment.

UNLOADING

One arm is released to pivot away from the tire. The bike is then lifted or rolled off the track.

SCOPE

Specifics in the description and drawings illustrate preferred embodiments of the invention. The invention is not limited to these particulars, and changes may be made therein without departing from the scope of the invention, which is defined by the claims and their legal equivalents.

The rack may be used in any orientation. For example, it may be mounted vertically on a showroom wall, holding a bicycle vertically. A wide, sturdy implementation of the rack may be used to carry a motorcycle.

I claim:

1. A rack for carrying a two-wheeled vehicle, the rack comprising:

an elongated horizontal U-channel track, with the open side of the channel facing upward, into which are set the wheels of the vehicle;

an inverted U-shaped arm attached near each end of the track, of a length to contact the nearest wheel of the vehicle at a point approximately 45 degrees above and outward of the axle of said nearest wheel, as measured about the circumference of said nearest wheel from an origin at its axle;

at least one of the arms having a pivotal connection to the track, and means for adjusting the angle of said one arm relative to the track;

whereby, said one arm can be pivoted inward, causing the wheels of a vehicle set in the track to be bracketed between the arms, such that the vehicle is secured in all directions by its wheels.

2. The rack of claim 1, wherein said arm-adjusting means comprises a bracket mounted on the track, the bracket having a swiveling C-shaped journal, a threaded rod having two ends, one end pivotally mounted to said one arm, and a knob threaded onto the rod, the knob having a generally cylindrical stem that is set into the C-journal.

3. The rack of claim 1, wherein said arm-adjusting means comprises a linear guide attached to the track, a handle slidably mounted on the guide, a catch on the handle for releasable fixation of the handle relative to the guide, and a brace having two ends, one end pivotally mounted to said one arm, the other end pivotally mounted to the handle, whereby the handle is releasably fixable at a desired position along the guide, holding said one arm at a desired pivot angle relative to the track.

4. A rack for carrying a two-wheeled vehicle of a type with an axle and tire on each wheel, the rack comprising:

an elongated track for receiving the wheels of said vehicle;

a generally U-shaped arm attached near each end of the track, each arm being long enough to reach a point, on the nearest tire of said vehicle in the track, which point is approximately 45 degrees above and outward of the axle associated with said nearest tire, as measured about the circumference of said nearest tire from an origin at said associated axle;

at least one of the arms being pivotally attached to the track; and means for adjusting the pivot angle of said pivotal arm;

whereby a two-wheeled vehicle can be placed with its wheels in the track, and the pivoting arm rotated inward to bracket the tires of said vehicle between the two arms, securing the vehicle in all directions.

5. The rack of claim 4, wherein said angle-adjusting means comprises a bracket mounted on the track, the bracket having a swiveling C-shaped journal, a threaded rod having two ends, one end pivotally mounted to said one arm, and a knob threaded onto the rod, the knob having a generally cylindrical stem that is set into the C-journal.

6. The rack of claim 4, wherein said angle-adjusting means comprises a linear guide attached to the track, a handle slidably mounted on the guide, a catch attached to the handle for releasable engagement with guide, and a diagonal bar having two ends, one end pivotally mounted to said one arm, the other end pivotally mounted to the handle, whereby the handle is releasably fixable at a desired position along the guide, holding said one arm at a desired pivot angle relative to the track.

7. A rack for carrying a two-wheeled vehicle, the rack comprising:

an elongated horizontal U-channel track, with the open side of the channel facing upward, into which are set the wheels of the two-wheeled vehicle to be carried;

an inverted U-shaped arm attached near each end of the track;

at least one of the arms having a pivotal connection to the track;

means for adjusting the angle of said one arm relative to the track, comprising a bracket mounted on the track, the bracket having a swiveling C-shaped journal, a threaded rod having two ends, one end pivotally mounted to said one arm, and a knob threaded onto the rod, the knob having a generally cylindrical stem that is set into the C-journal;

whereby, said one arm can be pivoted inward, causing the wheels of the vehicle to be bracketed between the arms, such that the vehicle is secured in all directions by its wheels.

* * * * *